S. A. THOMAS.
BUTTER PATTY FORMING MACHINE.
APPLICATION FILED FEB. 1, 1918. RENEWED MAR. 27, 1919.
1,320,293.
Patented Oct. 28, 1919.
2 SHEETS—SHEET 1.
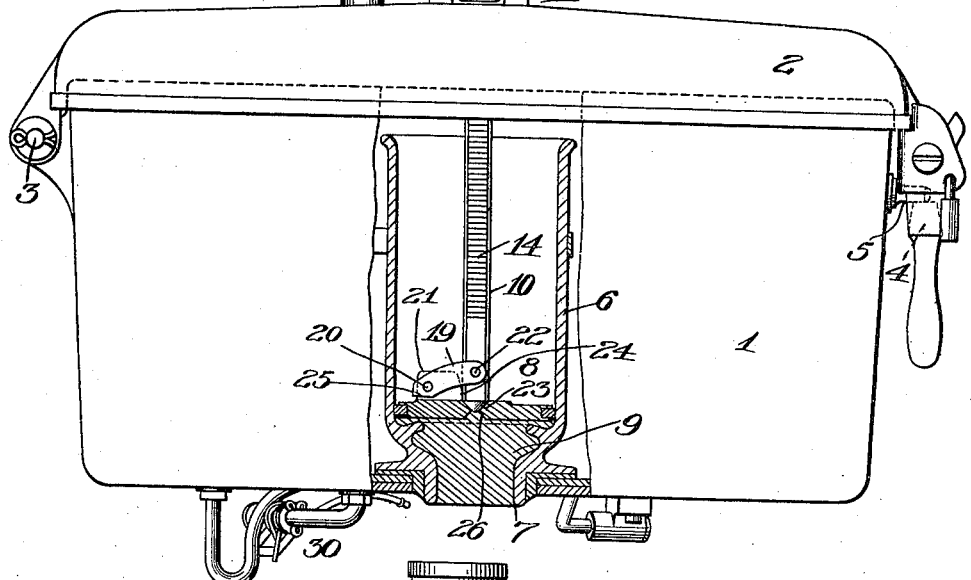
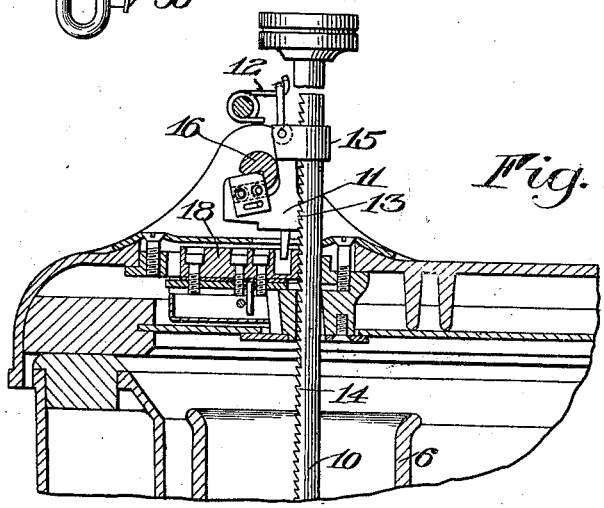
WITNESSES:
INVENTOR.
Sherman A. Thomas
BY
ATTORNEYS.

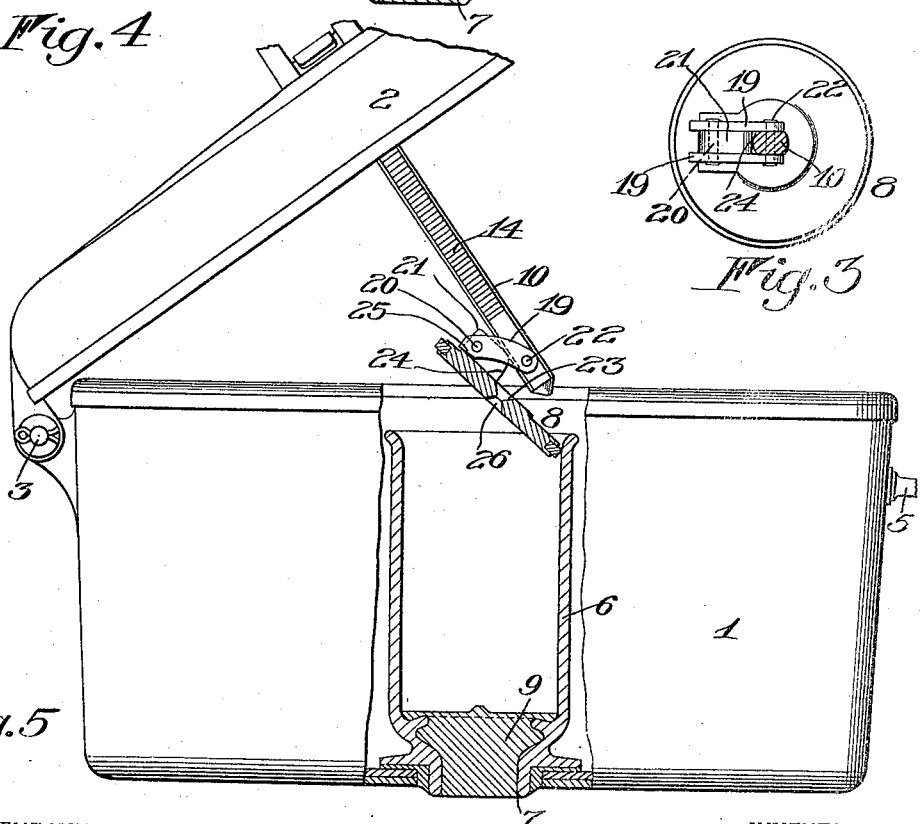

UNITED STATES PATENT OFFICE.

SHERMAN A. THOMAS, OF ROCHESTER, NEW YORK, ASSIGNOR, BY MESNE ASSIGNMENTS, TO FOOD APPLIANCES MANUFACTURING CORPORATION, OF ROCHESTER, NEW YORK, A CORPORATION OF NEW YORK.

BUTTER-PATTY-FORMING MACHINE.

1,320,293.   Specification of Letters Patent.   Patented Oct. 28, 1919.

Application filed February 1, 1918, Serial No. 214,870. Renewed March 27, 1919. Serial No. 285,654.

*To all whom it may concern:*

Be it known that I, SHERMAN A. THOMAS, of Rochester, county of Monroe, and State of New York, have invented certain new and useful Improvements in Butter-Patty-Forming Machines; and I do hereby declare the following to be a full, clear, and exact description of the same, reference being had to the accompanying drawings, forming a part of this specification, and to the reference-numerals marked thereon.

This invention relates to machines for forming patties or shapes from butter, cheese, or other plastic material, and embodying a casing having a hinged cover, a container in the casing, a plunger in the container for expelling its contents, and a rod held to the hinged casing cover and operating the plunger.

The invention has for its main object to prevent injury to the machine parts, more especially the container, the plunger, and its rod, should the casing cover be inadvertently opened on its hinges without first withdrawing the plunger from the container, and to permit free and harmless opening of the cover at any time irrespective of the position the plunger may then have in the container.

A further object is to provide an air vent aperture through the plunger which is closed by its operating rod acting as a valve, said rod having a jointed connection with the plunger, whereby the above named main object is attained, and whereby also the initial retractive movement of the rod opens the vent aperture and instantly admits air in front of the plunger thereby breaking the suction and permitting easy manual withdrawal of the plunger from the container to allow recharging of it with butter or other substance after the casing cover is opened, and also to facilitate thorough cleansing of all parts of the machine. To these and other ends the invention consists in certain improvements and combinations of parts, all as will be hereinafter more fully described the novel features being pointed out in the claims at the end of the specification.

In the drawings:

Figure 1 is a front sectional elevation of parts of a butter patty forming machine showing a preferred embodiment of this invention.

Fig. 2 is a vertical sectional side view of a preferred plunger actuating mechanism mounted on the hinged casing cover which carries the plunger rod.

Fig. 3 is an enlarged top plan view of the plunger and a preferred yielding link connection between it and its operating rod which is in horizontal section.

Fig. 4 is a detail sectional front view illustrating the first stage of the retractive movement of the plunger in the container, and Fig. 5 shows the plunger almost lifted from the container as the casing cover approaches the limit of its upward opening movement.

Similar reference characters throughout the several views indicate the same parts.

The numeral 1 indicates the body portion of the machine casing, and 2 its cover hinged thereto at 3, and carrying a latch 4, acting under a body stud 5 to hold the cover tightly closed. Within the body 1 is held container 6 having an outlet 7. A plunger 8 movable in the container is intermittently forced downwardly to expel butter or other plastic substance 9 from the container outlet 7, by a rod 10 normally carried by the casing cover 2 and swinging upwardly therewith on the hinges 3, as the plunger automatically adjusts itself upon the rod at their yielding connection, as hereinafter more fully explained.

Any approved mechanism carried by the casing cover 2 may be used to intermittently depress the rod 10 and the plunger 8, such as a pawl 11 yieldingly sustained by a spring 12 and having teeth 13 engaging teeth 14 on the rod 10. The pawl is shown with a fixed guiding yoke 15, loosely surrounding the rod 10. A cam shaft 16 rocked by an oscillatory lever 17 thereon, lowers the pawl 11 to advance the plunger 8 when the lever is depressed. A spring pressed detent 18 engages the rod teeth 14 to hold the advanced rod and plunger when the pawl 11 is retracted by the spring 12 prior to the next depression of the lever to again advance the plunger another short distance about equal to the length of one of the rod teeth 14 to expel sufficient butter from the container outlet 7 to form a patty which is cut off by a horizontally oscillating severing device 30 preferably actuated by gearing on the cam shaft 16 as the lever 17 makes its return or upward stroke. The severing device and its actuating mechanism form no part of this invention and therefore are not shown in detail in the drawings nor hereinafter further mentioned.

The important yielding connection of the plunger 8 with its operating rod 10, may be made in various ways provided it permit withdrawal of the fully advanced plunger from the container, as the casing cover 2 is being opened, without injury to the associated parts. The plunger may be directly pivoted to the lower end of its rod 10, but it is preferred to yieldingly connect them by two links 19, 19, pivoted at their one ends by a pin 20 to a fixed stud 21 on the back of the plunger 8, and pivoted at their other ends by a pin 22, to the rod 10 near its forward end which bears directly upon the plunger, as shown in Fig. 1, when giving it its forward stroke for expelling the butter or other contents 9 of the container from its mouth 7.

It is now preferred to make a countersink 23 in the upper face of the plunger 8, to form a steadying seat for the rounded or tapered forward end of the rod 10, while one side of the rod bears against a stop shoulder 24 formed by the inner end wall of the plunger stud 21, as the rod assumes its vertical operative position. A shoulder 25, on each of the links 19, near the pivot 20, coacts with the back face of the plunger to form a stop limiting the initial down-swinging of the plunger on said pivot during withdrawal of the plunger, as hereinafter more fully explained.

A simple but important further improvement consists in making through the plunger 8, an air vent aperture 26, at a point directly opposite the bearing or seat upon or within which the forward end of the rod 10 bears as it imparts intermittent advance movements to the plunger, and at such times the rod end forms a valve closing the vent aperture 26, to prevent back flow through it of any portion of the butter or substance 9, within the container 6. It is preferred to downwardly flare the vent aperture 26 to allow the more free lateral inflow of air through it and under the plunger to break the suction between it and the butter or substance 9, as the plunger begins its retractive movement.

It is always preferable, and instructions are given, to withdraw the fully advanced plunger from the container before opening the casing cover to allow recharging of the container or for replenishing the ice supply in the casing or for cleaning purposes, but these instructions are sometimes disregarded by forgetful operators with resultant bending or breaking of the formerly used rigidly connected plunger rod, or breaking of the container, or overstraining of the hinges of the casing cover. These disadvantages are overcome by use of the yielding plunger rod connection herein described.

In these machines provision is made for disengaging both the pawls 11 and the detent 18 from the plunger rod 10, by giving an extreme backward movement to the operating lever 17, thus freeing the rod and allowing the plunger to be manually retracted or withdrawn from the container by the rod before the casing cover is opened. An initial portion of this operation is substantially the same if the rod be first released from the pawl and detent and then be manually withdrawn from the container before opening the casing cover, or if the cover be opened without first withdrawing the plunger 8 from the container 6. This initial operation is illustrated in Fig. 4, which shows that immediately the rod 10 begins to retract, it will be lifted slightly at one side portion on the link pivot 20, thus unseating the rod end valve from the plunger recess 23, if used, and opening the plunger vent aperture 26, to admit air underneath the plunger 8 to break the suction and allow its inner face to gradually strip easily from the remnant of the butter charge 9 in the container 6, and this initial movement ceases when the link stop shoulders 25 strike the upper face of the plunger 8. The relative arrangement of the rod 10 and the plunger vent aperture 26, thus assures a comparatively easy manual withdrawal of the plunger in or from the container 6.

When thus manually withdrawing the rod and plunger they may retain the last above described relative adjustment until the plunger entirely leaves the container, but when the casing cover 2 is mistakenly opened without first withdrawing the plunger from the container the operation is in part as illustrated in both Figs. 4 and 5 of the drawings. Fig. 4 shows that when the casing cover 2 is but slightly opened it lifts the rod 10, thereby slightly raising the plunger 8 at one edge portion as its rocks on the plunger and link pivot 20 until stopped by the link shoulders 25. Further opening of the cover causes the rod 10 carried by it to assume a gradually increasing incline toward the plunger 8 which is now rocking on the link and rod pivot 22, in the same general direction, as shown in Fig. 5. A little before the casing cover 2 reaches its fully open position the plunger 8 is entirely withdrawn from the container 6 without overstraining or injuring the plunger, its rod, the container, or the hinge connections of the cover 2 with the casing body 1. The opened cover may not again be safely closed without first drawing the rod 10 and the plunger 8 fully backward in their supports on the cover which must be done to permit safe entrance of the plunger into the container. For this reason it is better practice to always fully withdraw the plunger from the container manually before opening the casing cover as the pawl 11 and detent 18 may then be more conveniently disengaged from the plunger rod than is possible after the cover is swung upward to fully open position.

It will be specially noticed that the herein described link connection of the plunger 8 and its rod 10, assures that the heavy strains incident to forcing the plunger forward in the container by the rod to expel the butter or substance 9, fall entirely upon the valve end of the rod and its opposing seat on the plunger and not upon the links 19, or on either of their pivots 20, 22, and this favorable condition of use continues indefinitely regardless of the extent of wear of the rod end valve or of its seat on the plunger, thus always assuring a positively tight closure of the plunger vent aperture 26 by the valve end of the rod 10, to prevent upward leakage of the container contents through this aperture during intermittent advances of the plunger in the container by the rod.

I have used one or two links to couple the plunger 8 to the rod 10, but in practice the coupling comprising the illustrated two links is preferred because of increased strength and durability. The term "link" used in the appended claims is therefore to be construed as including one link or two links coupling the plunger to its operating rod.

I claim as my invention:

1. A machine of the character described comprising a casing having a body portion and a cover hinged thereto, a container having an outlet and held in the casing body, a rod carried by the cover, and a plunger movable in the container and a connection with the rod comprising a link pivoted at one end to the plunger and at the other end to the rod adjacent its forward end which bears upon the plunger when giving it its forward stroke for expelling contents of the container.

2. A machine of the character described comprising a casing having a body portion and a cover hinged thereto, a container having an outlet and held in the casing body, a rod carried by the cover, a plunger movable in the container and a connection with the rod comprising a link pivoted at one end to the plunger and at the other end to the inner part of the rod, and a stop for the link limiting the initial lifting of the rod from the plunger upon the link and plunger pivot, and then permitting further bodily swinging of the plunger in the same lateral direction upon the link and rod pivot.

3. A machine of the character described comprising a casing having a body portion and a cover hinged thereto, a container having an outlet and held in the casing body, a rod carried by the cover, a plunger movable in the container and having a jointed connection with the rod comprising a link pivoted at one end to the plunger and pivoted at the other end to the inner part of the rod and a stop on the plunger for the rod limiting lateral swinging of the plunger toward operative position upon its pivotal connection with the link and rod.

4. In a machine of the character described, the combination with a container having an outlet, a plunger having an air vent aperture and adapted for operation in the container, and a rod having a movable connection with the plunger and closing said air vent aperture as the rod gives the plunger its forward stroke to expel contents of the container and opening the vent aperture as the rod is retracted to withdraw the plunger.

5. In a machine of the character described, the combination with a container having an outlet, a plunger having an air vent aperture and adapted for operation in the container, a piston rod normally closing the aperture, and a link connection between the rod and the plunger upon which the valve end of the rod is relatively movable toward and from the plunger vent.

SHERMAN A. THOMAS.

Copies of this patent may be obtained for five cents each, by addressing the "Commissioner of Patents, Washington, D. C."